(12) United States Patent
Hoshino et al.

(10) Patent No.: US 9,535,262 B2
(45) Date of Patent: Jan. 3, 2017

(54) OPTICAL MEMBER AND METHOD OF MANUFACTURING OPTICAL MEMBER

(71) Applicant: HOYA LENS MANUFACTURING PHILIPPINES INC., Cavite (PH)

(72) Inventors: Yuta Hoshino, Shinjuku-ku (JP); Yuko Imai, Shinjuku-ku (JP)

(73) Assignee: EHS LENS PHILIPPINES, INC., Cavite (PH)

( * ) Notice: Subject to any disclaimer, the term of this patent is extended or adjusted under 35 U.S.C. 154(b) by 43 days.

(21) Appl. No.: 14/383,587

(22) PCT Filed: Feb. 13, 2013

(86) PCT No.: PCT/JP2013/000769
§ 371 (c)(1),
(2) Date: Mar. 6, 2015

(87) PCT Pub. No.: WO2013/132751
PCT Pub. Date: Sep. 12, 2013

(65) Prior Publication Data
US 2015/0168742 A1    Jun. 18, 2015

(30) Foreign Application Priority Data

Mar. 8, 2012 (JP) .................................. 2012-052326

(51) Int. Cl.
*G02C 7/02* (2006.01)
*G02B 1/10* (2015.01)
(Continued)

(52) U.S. Cl.
CPC . *G02C 7/02* (2013.01); *G02B 1/10* (2013.01); *G02B 1/14* (2015.01); *G02C 7/00* (2013.01); *G02C 7/049* (2013.01); *G02C 2202/16* (2013.01)

(58) Field of Classification Search
CPC ............. G02C 7/02; G02C 7/00; G02C 7/049; G02B 1/14; G02B 1/10
(Continued)

(56) References Cited

U.S. PATENT DOCUMENTS

2009/0297807 A1    12/2009 Kojima et al.

FOREIGN PATENT DOCUMENTS

CN    101372537 A    2/2009
CN    201266244 Y    7/2009
(Continued)

OTHER PUBLICATIONS

Davis, Robert L. et al., "Techniques for Improved Soft Contact Lens Fitting" ContactLens Spectrum, Aug. 1, 2005.*
(Continued)

*Primary Examiner* — Scott J Sugarman
*Assistant Examiner* — Kristina Deherrera
(74) *Attorney, Agent, or Firm* — Sughrue Mion, PLLC

(57) ABSTRACT

To provide an optical member, formed without generating cracks in a hard coat layer of desired film thickness, and a method of manufacturing an optical member that permits the manufacturing of the above optical member.
The optical member of the present invention is characterized by comprising a lens substrate having a curved surface, a porous intermediate layer formed so as to cover an edge portion of the lens substrate in a planar view along an optical axis of the optical member, and a hard coat layer formed so as to cover the lens substrate and the intermediate layer in the planar view; as well as characterized in that the hard coat layer comprises a thick film portion, formed on the edge portion of the hard coat layer and thicker than a center portion of the hard coat layer in the planar view, and when a maximum film thickness of the intermediate layer is denoted as A (μm) and a maximum film thickness of the
(Continued)

Figure 1:
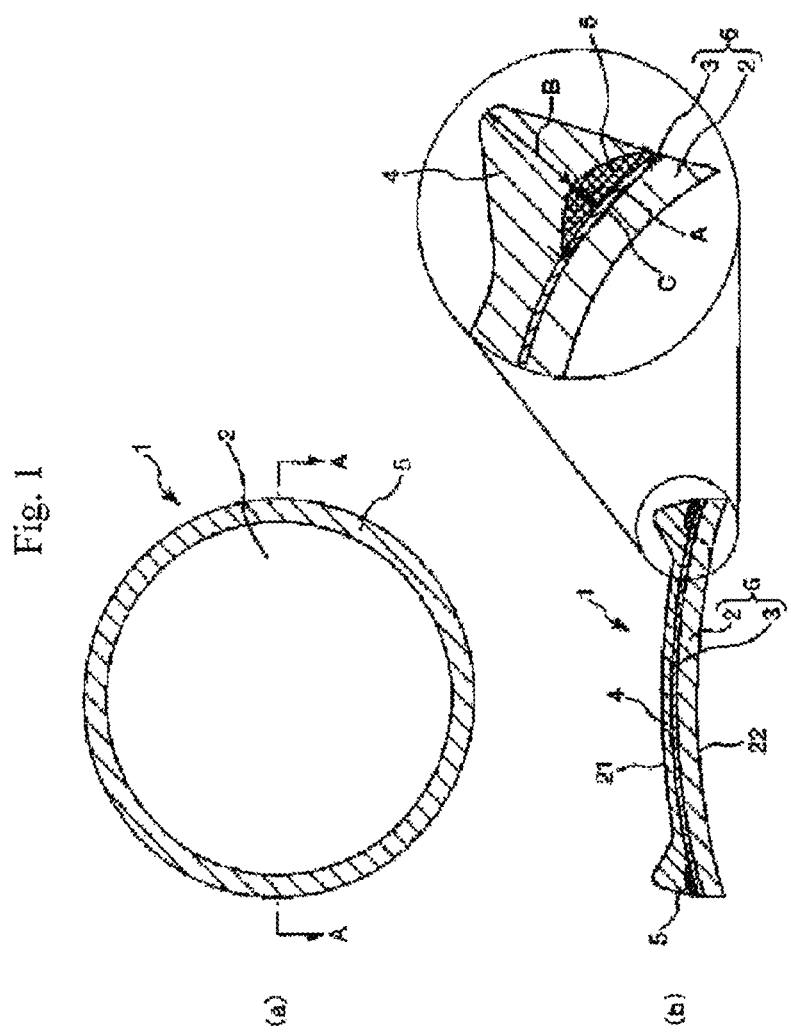

thick film portion is denoted as B (μm), a relation of A/B being equal to or greater than 3% but equal to or less than 20% is satisfied.

11 Claims, 6 Drawing Sheets

(51) Int. Cl.
 *G02C 7/00* (2006.01)
 *G02B 1/14* (2015.01)
 *G02C 7/04* (2006.01)
(58) Field of Classification Search
 USPC .............. 351/159.57, 159.67, 159.73–159.74
 See application file for complete search history.

(56) References Cited

FOREIGN PATENT DOCUMENTS

| JP | 2000-85025 A | | 3/2000 |
|----|---|---|---|
| JP | 2008-096511 A | * | 4/2008 |
| JP | 2008-96511 A | | 4/2008 |
| JP | 2009-132091 A | | 6/2009 |
| JP | 2010-32795 A | | 2/2010 |
| JP | 2010-033021 A | * | 2/2010 |
| JP | 2010-33021 A | | 2/2010 |
| WO | 2007/043301 A1 | | 4/2007 |

OTHER PUBLICATIONS

International Search Report and Search Opinion issued in PCT/JP2013/000769.

PCT/IB/338 International Preliminary Report on Patentability and attached Written Opinion, received in counterpart PCT/JP2013/000769.

Extended European Search Report issued in corresponding European Patent Application No. 13758313.4 dated Oct. 16, 2015.

Chinese Office Action issued in corresponding Chinese Patent Application No. 201380019321.X dated Jul. 1, 2015.

Australian Office Action issued in corresponding Australian Patent Application No. 2013228981 issued Jan. 12, 2016.

Korean Office Action issued in corresponding Korean Application No. 10-2014-7027874 dated Apr. 25, 2016.

Japanese Office Action issued in corresponding Japanese Patent Application No. 2012-052326 issued Mar. 1, 2016.

* cited by examiner

OPTICAL MEMBER AND METHOD OF MANUFACTURING OPTICAL MEMBER

CROSS REFERENCE TO RELATED APPLICATIONS

This application is a National Stage of International Application No. PCT/JP2013/000769 filed Feb. 13, 2013, claiming priority based on Japanese Patent Application No. 2012-052326 filed Mar. 8, 2012, the contents of all of which are incorporated herein by reference in their entirety.

TECHNICAL FIELD

The present invention relates to an optical member and a method of manufacturing an optical member.

BACKGROUND ART

For example, high refractive index materials have been actively researched and developed in recent years to achieve thinning of the plastic lenses employed in eyeglasses and the like.

Compared to conventional glass lenses, plastic lenses are lighter and easier to process. They also afford the advantage of relatively good strength relative to impact. On the other hand, they have poorer scratch resistance and weatherability than glass lenses due to lower hardness.

Thus, particularly when applying a plastic lens as an eyeglass lens, a cured film called a hard coat layer is generally formed on the plastic lens.

Further, when applying a plastic lens as an eyeglass lens, an antireflective layer is generally formed over the hard coat layer. However, when the difference in refractive index between the antireflective layer and the hard coat layer is excessive, an interference fringe is generated. As a result, there is a need to use a material with a high refractive index to constitute the hard coat layer.

A hard coat layer formed using a hard coat material containing an organic silicon compound (silane coupling agent) and a metal oxide is a known example of a hard coat layer achieving such a high refractive index.

More specifically, the sol-gel method has been proposed (for example, see Patent Reference 1) whereby a hard coat material containing an organic silicon compound, or a hydrolysis product thereof, and a metal oxide (composite oxide sol) is prepared, the hard coat material is supplied on the plastic lens, and heating is conducted to prepare a gel, yielding a hard coat layer.

However, when a hard coat layer is formed on an eyeglass lens using such a sol-gel method, because eyeglass lenses are usually comprised of curved surfaces, the hard coat layer will be thicker at the edge of the eyeglass lens. As a result, there is a problem in that cracks are generated in the hard coat layer on the edges.

PRIOR ART DOCUMENTS

Patent Document

Patent document1: Japanese Unexamined Patent Publication (KOKAI) No. 2010-33021

SUMMARY OF THE INVENTION

Problems to be Solved by the Invention

The object of the present invention is to provide an optical member, formed without generating cracks in a hard coat layer of desired film thickness, and a method of manufacturing an optical member that permits the manufacturing of the above optical member.

The above object is achieved by the present invention as set forth below.

The optical member of the present invention is characterized by comprising:

a lens substrate having a curved surface, a porous intermediate layer formed so as to cover an edge portion of the lens substrate in a planar view along an optical axis of the optical member, and a hard coat layer formed so as to cover the lens substrate and the intermediate layer in the planar view; as well as characterized in that the hard coat layer comprises a thick film portion, formed on the edge portion of the hard coat layer and thicker than a center portion of the hard coat layer in the planar view, and when a maximum film thickness of the intermediate layer is denoted as A (μm) and a maximum film thickness of the thick film portion is denoted as B (μm), a relation of A/B being equal to or greater than 3% but equal to or less than 20% is satisfied.

The present inventors conducted extensive research resulting in the discovery that by providing a porous intermediate layer on the edge portion of a lens substrate formed with a thick film portion, it was possible to decrease the generation of cracks (cracking). The present inventors conducted further extensive research resulting in the discovery that by specifying the relation between the maximum thickness of the intermediate film and the maximum thickness of the thick film portion of the hard coat film, it was possible to solve the problems set forth above. That is, when the maximum film thickness of the intermediate layer is denoted as A (μm) and the maximum film thickness of the thick film portion is denoted as B (μm), satisfying the relation of A/B being equal to or greater than 3% but equal to or less than 20% could reliably inhibit or prevent the generation of cracks in the thick film portion of the hard coat layer. The present invention was devised on that basis. It is thus possible to provide an optical member in which a hard coat layer of desired thickness is formed without generating cracks.

In the optical member of the present invention, the intermediate layer is desirably formed so as to cover the entire edge portion of the lens substrate.

Thus, the hard coat layer can be formed without generating cracks.

In the optical member of the present invention, it is desirable for the width of the intermediate layer in the planar view to be equal to or greater than 0.1 mm but equal to or less than 15 mm.

Thus, for example, when employing an optical member in an eyeglass lens, an intermediate layer can be formed outside the region to be edge-processed (finished lens) and function as an intermediate layer. Thus, the hard coat layer can be formed without generating cracks.

In the optical member of the present invention, the maximum thickness of the intermediate layer is desirably equal to or greater than 0.1 μm but equal to or less than 10.0 μm.

Thus, an optical member can be obtained in which the relation of A/B×100 is set to within the above range.

In the optical member of the present invention, the film thickness of the center portion of the hard coat layer is desirably equal to or greater than 1.5 μm but equal to or less than 50.0 μm.

Thus, it is possible to enhance adhesion of the intermediate layer to the lens substrate and to the hard coat layer.

In the optical member of the present invention, the intermediate layer desirably contains granules formed of resin material.

Thus, it is possible to obtain an optical member in which a hard coat layer of targeted thickness can be formed without generating cracks.

In the optical member of the present invention, the lens substrate desirably comprises a curved convex surface and a curved concave surface, with the intermediate layer and the hard coat layer desirably being provided on the curved convex surface.

Thus, the hard coat layer is afforded good strength.

The method of manufacturing an optical member of the present invention comprises:

forming a porous intermediate layer such that an edge portion of a lens substrate having a curved surface is covered in a planar view along an optical axis of the optical member; and forming a hard coat layer having a thick film portion, the thick film portion being formed on the edge portion and thicker than a center portion in the planar view, such that the lens substrate and the intermediate layer are covered in the planar view; as well as characterized in that the hard coat layer is formed so as to satisfy a relation of A/B being equal to or greater than 3% but equal to or less than 20% when a maximum thickness of the intermediate layer is denoted as A (μm) and a maximum thickness of the thick film portion is denoted as B (μm).

Thus, it is possible to manufacture an optical member in which a hard coat layer of targeted film thickness is formed without generating cracking.

FIG. 1 Drawings showing a first implementation mode in which the optical member of the present invention is applied to an eyeglass lens.

Figure 2:
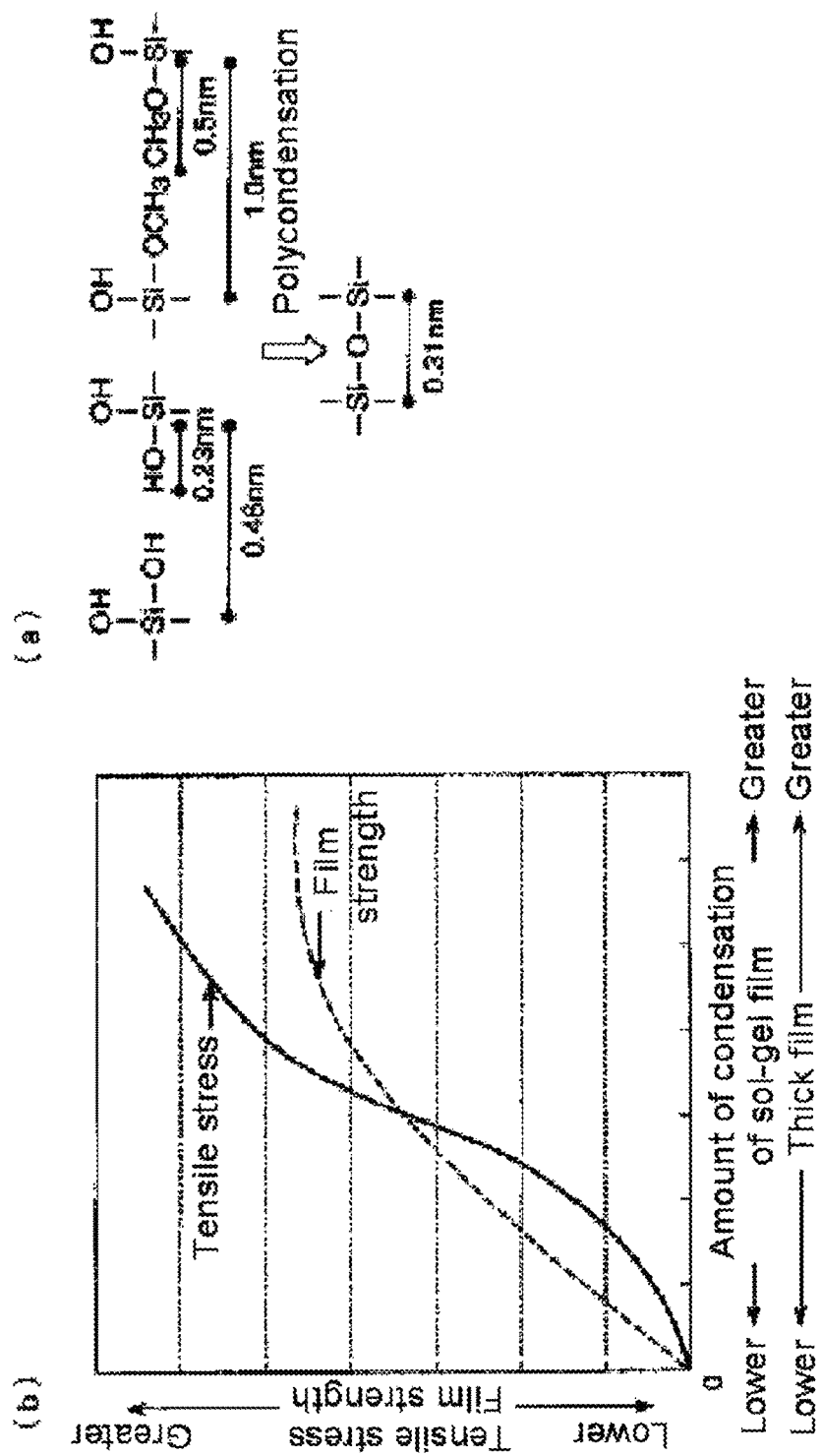

FIG. 2 A graph schematically showing the relation between film strength, tensile stress, and film thickness.

Figure 3:
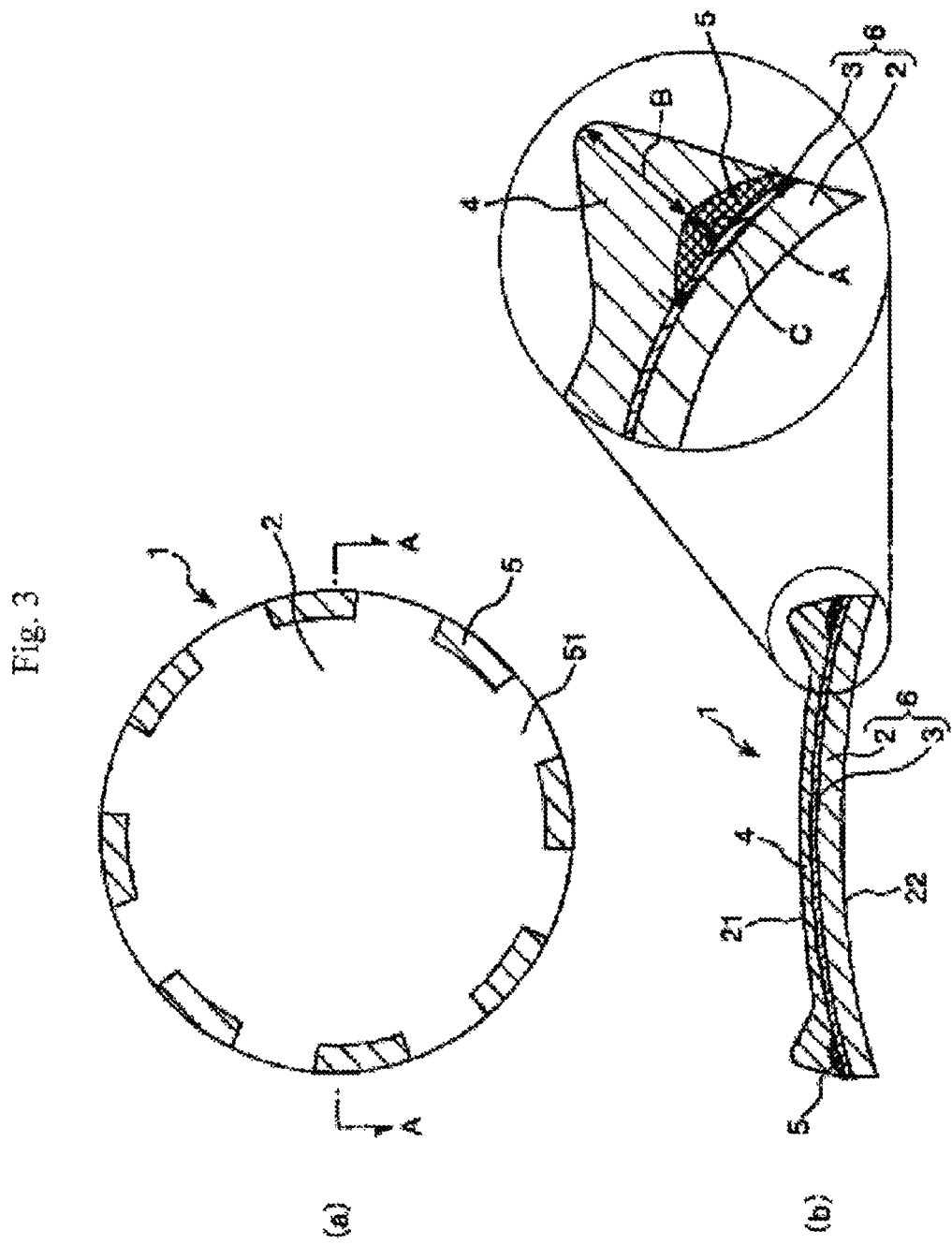

FIG. 3 Drawings showing a second implementation mode in which the optical member of the present invention is applied to an eyeglass lens.

Figure 4:
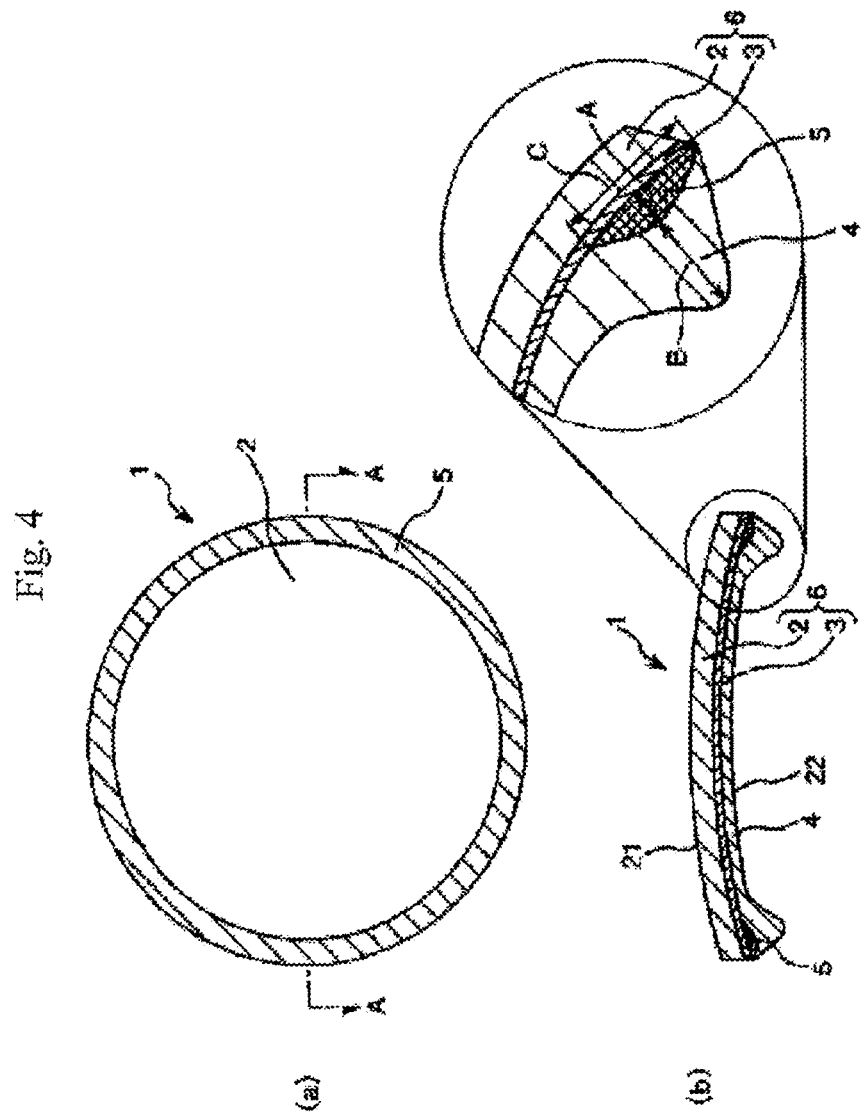

FIG. 4 Drawings showing a third implementation mode in which the optical member of the present invention is applied to an eyeglass lens.

Figure 5:
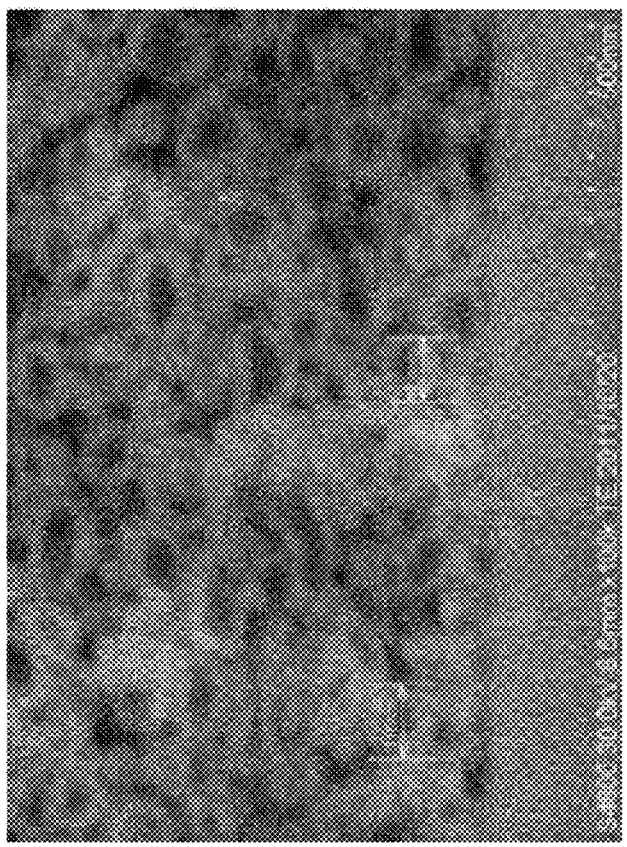

FIG. 5 An electron microscope photograph of the intermediate layer of Example.

Figure 6:
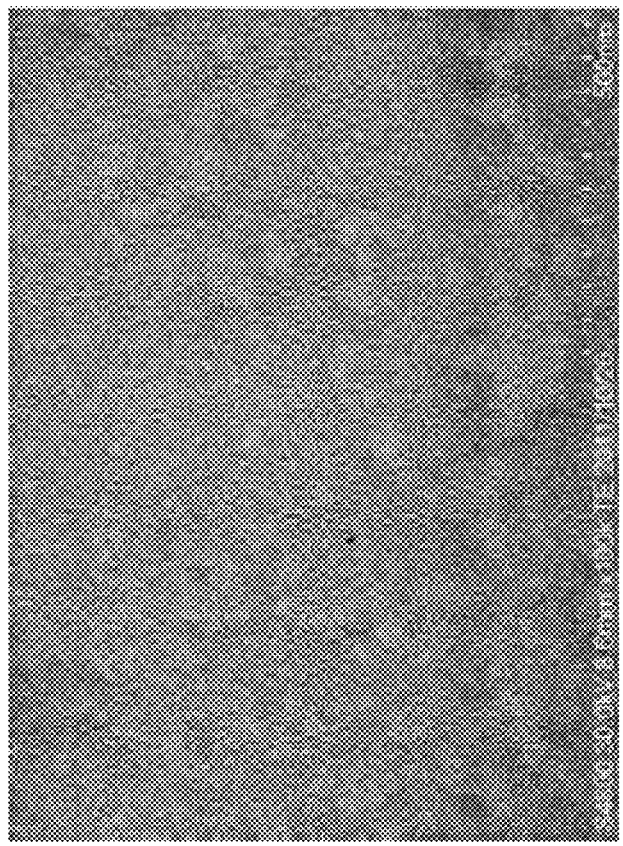

FIG. 6 An electron microscope photograph of a coating in Comparative Example 6.

MODE FOR CARRYING OUT THE INVENTION

The optical member and method of manufacturing an optical member of the present invention will be described in detail below based on suitable implementation modes depicted in the attached drawings.

An example of a case in which the optical member of the present invention is applied to an eyeglass lens that is provided in an eyeglass will be described below.

<First Implementation Mode>

FIG. 1 shows drawings of a first implementation mode in which the optical member of the present invention is applied to an eyeglass lens ((a) planar view, (b) sectional view along section line A-A in FIG. 1(a)). FIG. 2 is a graph showing the relation between film strength, tensile stress, and film thickness. Hereinafter, the object side of the eyeglass lens in FIG. 1(b) (the side relatively close to the object that is viewed when the eyeglass lens is being worn) will be referred to as "upper" and the eyeball side of the eyeglass lens (the side relatively close to the eyeball when the eyeglass lens is being worn) will be referred to as "lower". In FIG. 1, to facilitate the description, the size, thickness, and the like of constituent parts of the eyeglass lens have been exaggerated in a schematic rendering, differing greatly from the actual size, thickness, and the like of the various parts.

As shown in FIG. 1, eyeglass lens 1, which is a plastic lens that is provided in eyeglasses, comprises a lens substrate 6 having a curved surface, an intermediate layer 5 formed so as to cover the edge portion of lens substrate 6 in a planar view viewed along the optical axis of eyeglass lens 1 (referred to simply as a "planar view", hereinafter), and a hard coat layer 4 formed so as to cover lens substrate 6 and intermediate layer 5.

In the present implementation mode, lens substrate 6 comprises a base material 2 formed of plastic and a primer layer 3 formed so as to cover base material 2 in the planar view.

Base material 2 is a base material (substrate) formed of plastic and constituting an eyeglass lens.

As shown in FIG. 1, base material 2 is of circular shape in the planar view, with the upper surface 21 thereof constituting a curved convex surface and the lower surface 22 thereof constituting a curved concave surface. Upper surface 21 and lower surface 22 constitute light-passing surfaces through which light passes. Base material 2 need not be circular in shape.

The material constituting base material 2 can be, for example, a methyl methacrylate homopolymer; a copolymer comprised of monomer components in the form of methyl methacrylate and one or more other monomers; a diethylene glycol bisallyl carbonate homopolymer; a copolymer comprised of monomer components in the form of diethylene glycol bisallyl carbonate and one or more other monomers; an iodine-containing copolymer; a halogen-containing copolymer; a polycarbonate; a polystyrene; a polyvinyl chloride; an unsaturated polyester; polyethylene terephthalate; polyurethane; polythiourethane; a homopolymer comprising a monomer having sulfide bonds; a copolymer comprising monomer components in the form of a sulfide and one or more other monomers; a copolymer comprising monomer components in the form of a polysulfide and one or more other monomers; and a copolymer comprising monomer components in the form of a polydisulfide and one or more other monomers.

When a material constituting base material 2 that has a relatively high refractive index of about equal to or greater than 1.6 is employed, by suitably adjusting eyeglass lens 1 by means of the refractive indexes of primer layer 3 and hard coat layer 4, it is possible to reliably inhibit or prevent the formation of interference fringes in eyeglass lens 1 by compensating the difference in refractive index between the antireflective layer and base material 2.

Primer layer 3 is laminated between base material 2 and hard coat layer 4, and functions to ensure adhesion between base material 2 and hard coat layer 4 and enhance the impact resistance of base material 2.

The material constituting primer layer 3 can be, for example, acrylic resin, melamine resin, urethane resin, epoxy resin, polyvinyl acetal resin, amino resin, polyester resin, polyamide resin, vinyl alcohol resin, styrene resin, silicone resin, mixture or copolymer of the above, or some other resin material. Of these, polyurethane resin or polyester resin is desirable. This makes it possible to enhance the adhesion between base material 2, hard coat layer 4, and primer layer 3.

Primer layer 3 can further contain a metal oxide in addition to the above resin material. This makes it possible to raise the refractive index of primer 3. By adjusting the content thereof, it is possible to achieve a primer layer 3 of desired refractive index.

The metal oxide is not specifically limited. Examples are oxides of Si, Al, Sn, Sb, Ta, Ce, La, Fe, Zn, W, Zr, In and Ti. These oxides can be used singly or in combinations of two or more. The metal oxide can also be a sol comprised of microparticles of metal oxide.

The average thickness of primer layer 3 is not specifically limited. It is desirably 100 to 2,000 nm, preferably 500 to 1,000 nm.

Primer layer 3 can be omitted based on various combinations of base material 2 and hard coat layer 4. That is, lens substrate 6 can be comprised of just base material 2.

Hard coat layer 4 is provided so as to cover lens substrate 6 (primer layer 3) and intermediate layer 5 in the planar view, and functions to enhance the friction resistance and weatherability of base material 2.

Hard coat layer 4 in the present implementation mode is formed using a composition (hard coat material) containing an organic silicon compound (silane coupling agent) and a metal oxide.

The organic silicon compound is not specifically limited. For example, compounds denoted by general formula (1): $(R^1)_n Si(X^1)_{4-n}$ (where in general formula (1), $R^1$ denotes an organic group having a polymerizable functional group and 2 or more carbon atoms, $X^1$ denotes a hydrolyzable group, and n denotes the integer 1 or 2) can be employed. Since organic silicon compound molecules crosslink (link) through functional group $R^1$, hard coat layer 4 can afford good friction resistance and weatherability.

Details regarding the organic silicon compound that is denoted by general formula (1) will be set forth further below with regard to the method of manufacturing an eyeglass lens.

The metal oxide that is contained in hard coat layer 4 is not specifically limited. Examples are metal oxides of Al, Ti, Sb, Zr, Si, Ce, Fe, In and Sn. These oxides can be employed singly or in combinations of two or more. Of these, $TiO_2$, $ZrO_2$, $CeO_2$, $ZnO_2$, $SnO_2$, and ITO (indium-tin composite oxide) are preferred. These metal oxides can be contained in hard coat layer 4 to impart a higher refractive index to hard coat layer 4. Thus, when employing a base material 2 with a high refractive index, it is possible to achieve an eyeglass lens in which the generation of interference fringes is inhibited.

The film thickness in the center portion of hard coat layer 4 in the planar view is desirably set to 1.5 μm to 50.0 μm, preferably to 5.0 μm to 20.0 μm. Good strength is thus imparted to hard coat layer 4. The film thickness in the center portion of hard coat layer 4 can be a value measured at one point, or the average thickness over a prescribed region.

When hard coat layer 4 is formed using the sol-gel method, set forth further below, and the film thickness in the center portion of hard coat layer 4 in the planar view is set to 1.5 μm to 50.0 μm, the film thickness at the edge portion of hard coat layer 4 in the planar view becomes 3.3 μm to 100.0 μm. When the film thickness in the center portion is set to 5.0 μm to 20.0 μm, the film thickness at the edge portion of hard coat layer 4 becomes 6.0 μm to 50.0 μm. That is, when hard coat layer 4 is formed using the sol-gel method described further below, the film thickness at the edge portion thereof becomes greater than the film thickness in the center portion. In other words, it is formed so that the film thickness at the edge portion is greater than the film thickness in the center portion.

In an eyeglass lens 1 having a hard coat layer 4 configured as set forth above, providing an intermediate layer (dam layer) at the edge portion of lens substrate 6 (primer layer 3) can reliably inhibit or prevent the generation of cracks in the edge portion of hard coat layer 4. The reasons for this effect will be described in detail further below.

Intermediate layer 5 is provided parallel with the optical axis of eyeglass lens 1 in the edge portion of lens substrate 6 (primer layer 3) in the planar view, and so as to be positioned between lens substrate 6 and hard coat layer 4 in the sectional view when sectioned by a sectional plane running through the center of lens substrate 6 (referred to simply as the "sectional view", hereinafter). It has the function of inhibiting or preventing the generation of cracks in the edge portion of hard coat layer 4.

As shown in FIG. 1(a) in the present implementation mode, intermediate layer 5 is formed with an annular shape all the way around the entire edge portion of primer layer 3. In other words, intermediate layer 5 in the present implementation mode is formed continuously on the edge portion of primer layer 3. As indicated by the sectional view along section line A-A in FIG. 1(a), the sectional shape as sectional by a sectional plane running parallel to the optical axis of eyeglass lens 1 and through the center of lens substrate 6 is convex in shape.

Intermediate layer 5 contains granules in the present implementation mode.

The granules can be any granules formed of resin material and metal oxide material, and are desirable formed of resin material. They can thus more reliably inhibit or prevent the generation of cracks in the edge portion of hard coat layer 4.

Examples of the resin material constituting the granules are urethane resin, ester resin, epoxy resin, polyvinyl alcohol (PVA), polyvinyl pyrrolidone (PVP), polyvinyl butyral (PVB), polyacrylic acid, or polyvinyl chloride. Of these, urethane resin and polyester resin are desirable. It is thus possible to enhance adhesion of lens substrate 6, hard coat layer 4, and intermediate layer 5.

Examples of the metal oxide materials constituting the granules are $SiO_2$, hollow $SiO_2$, $TiO_2$, $ZrO_2$, $Al_2O_3$, $CeO_2$ and $SnO_2$.

In intermediate layer 5 thus configured, by specifying the relation between the height of the top portion of intermediate layer 5 and the height of the top portion on the edge portion (thicker portion) of hard coat layer 4, and by specifying the average particle diameter of the granules contained in intermediate layer 5, it is possible to inhibit or prevent the generation of cracks in hard coat layer 4. This point will be described in detail with regard to the method of manufacturing an eyeglass 1 further below.

Further, it is also possible to form an antireflective layer, not shown, on hard coat layer 4.

Examples of antireflective layers are layers comprising inorganic materials such as $SiO_2$, SiO, $ZrO_2$, $TiO_2$, TiO, $Ti_2O_3$, $Ti_2O_5$, $Al_2O_3$, $TaO_2$, $Ta_2O_5$, NbO, $Nb_2O_3$, $NbO_2$, $Nb_2O_5$, $CeO_2$, MgO, $Y_2O_3$, $SnO_2$, $MgF_2$, and $WO_3$.

Such an antireflective layer can be formed, for example, by the vapor deposition method, ion plating method, and sputtering method.

The average thickness of the antireflective layer is not specifically limited. It is desirably 50 to 150 nm, preferably 70 to 120 nm.

A water-repellent anti-fouling layer, not shown, can also be formed on the antireflective layer.

The antifouling layer can be obtained, for example, by forming a single-molecule film formed of an organic silicon compound containing fluorine on the antireflective layer.

An example of a fluorine-containing organic silicon compound is that denoted by general formula (2): $R^2SiX^1_3$ (where in general formula (2), $R^2$ denotes a fluorine-containing organic group with 1 or more carbon atoms and $X^1$ denotes a hydrolyzable group).

The antifouling layer can be obtained, for example, by preparing an antifouling layer-forming material by dissolving a fluorine-containing organic silicon compound in a solvent, employing a coating method to coat the antifouling layer-forming material on the antireflective layer, and then drying it. Examples of the coating method are the ink-jet method, the dipping method, and the spin-coating method.

The average thickness of the antifouling layer is not specifically limited. 0.001 to 0.5 μm is desirable and 0.001 to 0.03 μm is preferred.

An eyeglass lens 1 such as that set forth above can be manufactured in the following manner, for example.

[A] A base material 2 is first prepared and a primer layer 3 is formed on the surface (curved convex surface) 21 of base material 2 to obtain a lens substrate 6.

Primer layer 3 can be formed, for example, by dissolving the constituent materials of primer layer 3 in a solvent, preparing a dissolved primer layer-forming material, using a coating method to coat the primer layer-forming material on base material 2, and then drying it.

When the material constituting primer layer 3 will not dissolve in a solvent, the constituent material can be dispersed to obtain a primer layer-forming material.

The solvent is not specifically limited. Examples are: ethylene glycol monomethyl ether acetate, ethylene glycol monoethyl ether acetate, ethylene glycol monopropyl ether acetate, ethylene glycol monobutyl ether acetate, propylene glycol monomethyl ether acetate, propylene glycol monoethyl ether acetate, propylene glycol monopropyl ether acetate, propylene glycol monobutyl ether acetate, ethylene glycol dimethyl ether, ethylene glycol diethyl ether, ethylene glycol dipropyl ether, ethylene glycol dibutyl ether, diethylene glycol dimethyl ether, diethylene glycol diethyl ether, diethylene glycol dipropyl ether, diethylene glycol dibutyl ether, propylene glycol dimethyl ether, propylene glycol diethyl ether, and other glycols. These can be employed as single solvents or as mixed solvent.

Leveling agents in the form of copolymers of polyoxyalkylenes and polydimethyl siloxane, copolymers of polyoxyalkylenes and fluorocarbons, and the like can be additionally employed in the primer layer-forming material.

Examples of the coating method used to form primer layer 3 are the ink-jet method, dipping method, spin-coating method, and spray method.

[B] Next, intermediate layer 5 is formed on the edge portion of lens substrate 6 (primer layer 3) (intermediate layer-forming step).

Intermediate layer 5 can be formed, for example, by dispersing in a dispersing solvent the granules formed of the above-described resin material to prepare an intermediate layer-forming material, selectively coating (feeding) the intermediate layer-forming material onto the edge portion of primer layer 3 by a coating method, and then drying it.

The dispersing solvent in which the granules are dispersed can be the solvent as described in step [A] above.

Examples of the coating method that is employed to form intermediate layer 5 are the ink-jet method, dipping method, and spray method.

[C] Next, a hard coat layer 4 is formed so as to cover lens substrate 6 (primer layer 3) and intermediate layer 5 (hard coat layer-forming step).

Hard coat layer 4 can be formed in the following manner, for example using a hard coat layer-forming material (sol) obtained by dissolving in a solvent an organic silicon compound denoted by general formula (1): $(R^1)_nSi(X^1)_{4-n}$ (where in general formula (1), $R^1$ denotes an organic groups having a polymerizable functional group and two or more carbon atoms, $X^1$ denotes a hydrolyzable group, and n denotes the integer 1 or 2).

That is, it can be conducted by the sol-gel method: after preparing the hard coat layer-forming material (sol), the hard coat layer-forming material is coated (fed) so as to cover primer layer 3 and intermediate layer 5. Subsequently, heating is conducted to hydrolyze and polymerize hydrolyzable group $X^1$ contained in the organic silicon compound denoted by general formula (1), thus forming a siloxane oligomer and producing a gel.

An example of the organic silicon compound denoted by general formula (1) is one having an amino group as a polymerizable functional group. Specific examples are the compounds denoted by general formula (1A) below:

$$(R^2)_nSi(X^1)_{4-n} \qquad (1A)$$

(In general formula (1A), $R^2$ denotes a monovalent hydrocarbon group having an amino group and having two or more carbon atoms, $X^1$ denotes a hydrolyzable group, and n denotes an integer of 1 or 2.)

In general formula (1A), $R^2$ denotes a monovalent hydrocarbon group having an amino group and having two or more carbon atoms. Examples are a γ-aminopropyl group, N-β-(aminoethyle)-γ-aminopropyl group, and N-phenyl-γ-aminopropyl group.

In general formula (1A), n denotes an integer of 1 or 2. When there are multiple instances of $R^2$ (n=2), the multiple instances of $R^2$ can be identical or different, and the multiple instances of $X^1$ can be identical or different.

Specific examples of organic silicon compounds denoted by general formula (1A) are amino-based silane coupling agents such as: γ-aminopropyltrimethoxysilane, γ-aminopropyldimethoxydimethylsilane, γ-aminopropyltriethoxysilane, γ-aminopropyldiethoxymethylsilane, N-β-(aminoethyl)-γ-aminopropyldimethoxymethylsilane, N-β-(aminoethyl)-γ-aminopropyltrimethoxysilane, N-β-(aminoethyl)-γ-aminopropyltriethoxysilane, N-β-(aminoethyl)-γ-aminopropyldiethoxymethylsilane, N-phenyl-γ-aminopropyltrimethoxysilane, N-phenyl-γ-aminopropyldimethoxymethylsilane, N-phenyl-γ-aminopropyltriethoxysilane, and N-phenyl-γ-aminopropyldiethoxymethylsilane.

Examples of organic silicon compounds denoted by general formula (1) above are those having isocyanate groups in the form of polymerizable functional groups. Specific examples are the compounds denoted by general formula (1B) below:

$$(R^3)_nSi(X^1)_{4-n} \qquad (1B)$$

(In general formula (1B), $R^3$ denotes a monovalent hydrocarbon group having an isocyanate group and having two or more carbon atoms, $X^1$ denotes a hydrolyzable group, and n denotes an integer of 1 or 2.)

In general formula (1B), $R^3$ denotes a monovalent hydrocarbon group having an isocyanate group and having two or more carbon atoms, such as an isocyanate methyl group, α-isocyanate ethyl group, β-isocyanate ethyl group, α-isocyanate propyl group, β-isocyanate propyl group, or γ-isocyanate propyl group.

In general formula (1B), n denotes an integer of 1 or 2. When there are multiple instances of $R^3$ (n=2), the multiple instances of $R^3$ can be identical or different and the multiple instances of $X^1$ can be identical or different.

Specific examples of compounds denoted by general formula (1B) are isocyanate-based silane coupling agents such as: γ-isocyanatopropyltrimethoxysilane, γ-isocyanatopropyldimethoxymethylsilane, γ-isocyanatopropyltriethoxysilane, and γ-isocyanatopropyldiethoxymethylsilane.

Further examples of the organic silicon compound denoted by general formula (1) above are those having a polymerizable functional group in the form of an epoxy group. Specific examples are the compounds denoted by general formula (1C) below:

$$(R^4)_n Si(X^1)_{4-n} \qquad (1C)$$

(In general formula (1C), $R^4$ denotes a monovalent hydrocarbon group having an epoxy group and having two or more carbon atoms, $X^1$ denotes a hydrolyzable group, and n denotes an integer of 1 or 2.)

In general formula (1C), $R^4$ denotes a monovalent hydrocarbon group having an epoxy group and having two or more carbon atoms.

In general formula (1C), n denotes an integer of 1 or 2. When there are multiple instances of $R^4$ (n=2), the multiple instances of $R^4$ may be identical or different, and the multiple instances of $X^1$ may be identical or different.

Specific examples of compounds denoted by general formula (1C) are glycidoxymethyltrimethoxysilane, glycidoxymethyltriethoxysilane, α-glycidoxyethyltrimethoxysilane, α-glycidoxyethyltriethoxysilane, β-glycidoxyethyltriethoxysilane, β-glycidoxypropyltrimethoxysilane, α-glycidoxypropyltrimethoxysilane, α-glycidoxypropyltriethoxysilane, β-glycidoxypropyltriethoxysilane, γ-glycidoxypropyltrimethoxysilane, (3,4-epoxycyclohexyl)methyltrimethoxysilane, γ-glycidoxypropylvinyldiethoxysilane, γ-glycidoxypropylphenyldiethoxysilane, and δ-(3,4-epoxycyclohexyl)butyltriethoxysilane.

The hard coat layer-forming material can contain a curing catalyst to promote hydrolysis•polycondensation reaction, as well as various solvents, surfactants, and the like to enhance wettability during application on the lens substrate and smoothness. To the extent that they do not affect the physical properties of the hard coat layer, ultraviolet radiation-absorbing agents, oxidation-inhibiting agents, photostabilizers, and the like can be added to the hard coat layer-forming material.

Examples of curing catalysts are inorganic acids such as hydrochloric acid, sulfuric acid, and nitric acid; and organic acids such as oxalic acid, acetic acid, trifluoroacetic acid, methansulfonic acid, trifluoromethanesulfonic acid, and lactic acid.

Examples of solvents that will dissolve organic silicon compounds are water, organic solvents, and mixed solvents thereof. Specific examples are: water such as pure water, ultrapure water, and ion-exchange water; alcohols such as methanol, ethanol, isopropanol, n-butanol, and methylisocarbinol; ketones such as acetone, 2-butanone, ethyl amyl ketone, diacetone alcohol, isophorone, and cyclohexanone; amides such as N,N-dimethylformamide and N,N-dimethylacetamide; ethers such as diethyl ether, isopropyl ether, tetrahydrofuran, 1,4-dioxane, and 3,4-dihydro-2H-pyran; glycol ethers such as 2-methoxyethanol, 2-ethoxyethanol, 2-butoxyethanol, ethylene glycol dimethyl ether; glycol ether acetates such as 2-methoxyethyl acetate, 2-ethoxyethyl acetate, and 2-butoxyethyl acetate; esters such as methyl acetate, ethyl acetate, isbutyl acetate, amyl acetate, ethyl lactate, and ethylene carbonate; aromatic hydrocarbons such as benzene, toluene, and xylene; aliphatic hydrocarbons such as hexane, heptane, iso-octane, and cyclohexane; halogenated hydrocarbons such as methylene chloride, 1,2-dichloroethane, dichloropropane, and chlorobenzene; sulfoxides such as dimethyl sulfoxide; and pyrrolidones such a N-methyl-2-pyrrolidone and N-octyl-2-pyrrolidone.

Examples of coating methods used to form hard coat layer 4 are ink-jet method, spin-coating method, dip coating method, roll coating method, slit coater method, and transfer method.

Heating of the hard coat layer-forming material is desirably carried out by heating it to a first heating temperature, and then heating it to a second heating temperature.

The first heating temperature is desirably set to about 90 to 110° C., preferably 100±5° C.

The period of heating at the first heating temperature is set to about 1 to 10 minutes, preferably about 5 to 10 minutes.

The second heating temperature is desirably set to about 110 to 130° C., preferably to about 120±5° C.

The period of heating at the second heating temperature is set to about 1 to 2 hours, preferably to 1.5±0.2 hours.

The atmosphere during heating is not specifically limited. However, it can be an oxygen-containing atmosphere or an atmosphere of an inert gas such as nitrogen.

Heating under the conditions set forth above allows hydrolysis•polycondensation reaction to advance more suitably, making it possible to form a hard coat layer 4 of good film strength.

As set forth above, when hard coat layer 4 is formed on lens substrate 6 by the sol-gel method using the hard coat layer-forming material containing the organic silicon compound denoted by general formula (1) above, as shown in FIG. 2(a), the organic silicon compound undergoes a hydrolysis-polycondensation reaction. As a result, the distance between adjacent organic silicon compounds (here, the distance between adjacent silicon atoms) shortens to about ⅓ to ⅔. The hydrolysis-polycondensation reaction causes linking of the organic silicon compounds, enhancing film strength. Shortening of the distance between the organic silicon compounds generates tensile stress in the hard coat layer 4 that is formed.

Based on investigation by the present inventors, the relation between film strength and tensile stress is thought to be as follows.

As shown in FIG. 2(b), the thicker the film, the more molecules that can condense and be contained in hard coat layer 4. Thus, the amount of condensation (the amount of contraction of the entire film) increases. As a result, both the film strength and tensile stress increase as the amount of condensation in the layer increases, that is, as the film thickness increases. However, below a certain range of film thickness (at and below the amount of condensation at the point of intersection of the tensile stress curve and the film strength curve in FIG. 2(b)), the film strength is greater than the tensile stress. However, once this range of film thickness is exceeded (the region of higher amount of condensation than the point of intersection of the tensile stress curve and the film strength curve in FIG. 2(b)), this relation reverses and the tensile stress becomes larger than the film strength. As a result, when the film thickness of hard coat layer 4 that was formed increased beyond a certain range, cracks were found to form in hard coat layer 4.

When the sol-gel method is used to form a hard coat layer 4 on a lens substrate 6 having a curved surface (a curved convex surface in the present implementation mode) as in the present invention, the effect of gravity causes a thick film portion to form in the edge portion of lens substrate 6. Thus, there is a problem in that cracks are generated in the thick film portion of hard coat layer 4. Since the tensile stress increases in intensity the greater the film thickness of hard coat layer 4 becomes as set forth above, cracks tend to become a problem in hard coat layers 4 that are particularly thick.

The present inventors conducted extensive research into such problems. As a result, they discovered that by providing an intermediate layer 5 in the form of a porous film on the edge portion of lens substrate 6 on which a thick film portion was to be formed, it was possible to reduce the generation of cracks (cracking).

The present inventors then conducted further extensive research. As a result, they discovered that by specifying a relation between the maximum thickness of intermediate layer 5 and the maximum thickness of the edge portion (thick film portion) of hard coat layer 4, it was possible to eliminate the above problem.

That is, when the maximum value of the thickness of intermediate layer 5 is denoted as A [μm] and the maximum value of the thickness of the thick film portion of hard coat layer 4 is denoted as B [μm], satisfying the relation of A/B being equal to or greater than 3[%] was discovered to reliably inhibit or prevent the generation of cracks in the thick film portion of hard coat layer 4. The present invention was devised on this basis.

Forming an intermediate layer between lens substrate 6 and hard coat layer 4 and specifying the thickness of intermediate layer 5 in the present invention in this manner can prevent the generation of cracks in the thick film portion of hard coat layer 4.

The relation A/B between the maximum value A [μm] of the thickness of intermediate layer 5 and the maximum value B [μm] of the thickness of the thick film portion of hard coat layer 4 is set to equal to or greater than 3[%], with equal to or greater than 5[%] but equal to or less than 20[%] being desirable and equal to or greater than 7[%] but equal to or less than 15[%] being preferable. Thus, it is possible to reliably prevent or inhibit the generation of cracks in hard coat layer 4 while preventing thickening of the edge portion of eyeglass lens 1.

Further, intermediate layer 5 is a porous film. Specifically, it is desirable for intermediate layer 5 to contain granules. The average particle diameter of the granules contained in intermediate layer 5 is desirably equal to or greater than 80 nm. More preferably, the average particle diameter of the granules contained in intermediate layer 5 is desirably equal to or greater than 80 nm but equal to or less than 2,000 nm, preferably equal to or greater than 100 nm but equal to or less than 500 nm. Thus, it is possible to reliably prevent or inhibit the generation of cracks in hard coat layer 4.

It suffices for intermediate layer 5 to be provided so as to correspond to the edge portion of lens substrate 6, that is, the thick film portion of hard coat layer 4. However, when the planar view shape is a circular-ring shape as in the present implementation mode, the width C of the circular ring (the distance between the edge portion of intermediate layer 5 on the center side of lens substrate 6 and the edge portion on the outer circumference side on lens substrate 6 in the planar view) is desirably equal to or greater than 0.1 mm but equal to or less than 15 mm, preferably equal to or greater than 4 mm but equal to or less than 10 mm. This makes it possible to reliably achieve the effect obtained by forming intermediate layer 5.

Film thickness A of intermediate layer 5 is desirably equal to or greater than 0.1 μm but equal to or less than 10.0 μm. This makes it possible to set the relation of A/B to within the range set forth above.

It suffices to provide intermediate layer 5 in a manner corresponding to the edge portion of lens substrate 6, that is, the thick film portion of hard coat 4. When the planar view shape is a circular-ring shape as in the present implementation mode, width C is desirably equal to or greater than 0.1 mm but equal to or less than 15 mm, preferably equal to or greater than 4 mm but equal to or less than 18 mm. This makes it possible to reliably achieve the effect achieved by forming intermediate layer 5.

The reasons why the generation of cracks is prevented in hard coat layer 4 by providing intermediate layer 5 configured as set forth above are presumed to be as set forth below.

First, the difference between the coefficient of thermal expansion of lens substrate 6 and that of hard coat layer 4 is generally great. Providing intermediate layer 5 between these two is presumed to reduce the difference in the coefficients of thermal expansion.

Further, because intermediate layer 5 is porous, when the internal stress occurring in hard coat layer 4 propagates into intermediate layer 5, the voids in intermediate layer 5 disperse it. Thus, the internal stress of eyeglass lens 1 as a whole is inhibited. As a result, the generation of cracks in hard coat layer 4 is presumed to be inhibited.

In the present implementation mode, the case where intermediate layer 5 is formed in the edge portion along the rim portion of lens substrate 6 is described. However, there is no limitation to this configuration. It is also possible for hard coat layer 4 to be formed without forming intermediate layer 5 at the rim portion. The width of the region in which intermediate layer 5 is not formed is, for example, desirably set to about 1.0 to 2.0 mm.

<Second Implementation Mode>

A second implementation mode in which the optical member of the present invention is applied to an eyeglass lens will be described next.

FIG. 3 shows drawings of a second implementation mode in which the optical member of the present invention is applied to an eyeglass lens ((a) is a planar view and (b) is a sectional view along section line A-A in FIG. 3(*a*)).

In the eyeglass lens 1 of the second implementation mode, the differences with the eyeglass lens 1 of the first implementation mode will be primarily described and the description of items that are identical will be omitted.

Eyeglass lens 1 shown in FIG. 3 is identical to eyeglass lens 1 shown in FIG. 1 with the exception that the configuration of intermediate layer 5 is different.

That is, in eyeglass lens 1 in the second implementation mode, intermittent gaps 51 at which intermediate layer 5 is not formed are present as shown in FIG. 3.

To permit intermediate layer 5 to function properly, the occupancy ratio of intermittent gaps 51 in intermediate layer 5 in the planar view is desirably set to 1% to 20%, preferably 1% to 10%. This allows intermediate layer 5 to function properly to reliably inhibit or prevent the generation of cracks in hard coat layer 4.

In the eyeglass lens 1 of the second implementation mode, the same effect as in the first implementation mode can be achieved.

The sizes of the various portions are identical to those in eyeglass lens 1 in the first implementation mode.

<Third Implementation Mode>

A third implementation mode in which the optical member of the present invention is applied to an eyeglass lens will be described next.

FIG. 4 presents drawings showing the third implementation mode in which the optical member of the present invention is applied to an eyeglass lens ((a) is a planar view and (b) is a sectional view along section line A-A in FIG. 4(a)).

In the eyeglass lens 1 of the third implementation mode, the differences with the eyeglass lens 1 of the first implementation mode will be primarily described and the description of items that are identical will be omitted.

Eyeglass lens 1 shown in FIG. 4 is the same as eyeglass lens 1 in FIG. 1 with the exception that the surface on which intermediate layer 5 and hard coat layer 4 are formed differs.

That is, in eyeglass lens 1 of the third implementation mode, intermediate layer 5 and hard coat layer 4 are formed on the curved concave surface (surface on the eyeball side), not on the curved convex surface (surface on the object side) of lens substrate 6.

In eyeglass lens 1 of the third implementation mode thus configured, the same effect as in the first implementation mode can be achieved on the curved concave surface.

In the method of manufacturing eyeglass lens 1 of the third implementation mode thus configured, forming hard coat layer 4 in the following manner after forming intermediate layer 5 is effective to inhibit cracking of the thick film portion.

That is, with the curved concave surface facing upward (in the opposite direction from that in which gravity acts), a hard coat layer-forming material is coated on the curved concave surface. Subsequently, lens substrate 6 is flipped over so that the curved concave surface faces downward (in the same direction as that in which gravity acts). Due to the effect of gravity, the hard coat layer-forming material forms thickly on the edge portion of the curved concave surface. In this state, heating the hard coat layer-forming material results in the manufacturing of an eyeglass lens 1 having a hard coat layer 4 with a thick film portion on the rim portion. The reason why the thick film portion is formed on the edge portion of eyeglass lens 1 is to ensure the optical performance of the center portion of eyeglass lens 1. That is, the reason is to inhibit a drop in optical performance in the center portion (the region of the eyeglass that is used) due to the effect of gravity, the hard coat layer-forming material accumulates in the center portion of the eyeglass lens, thereby forming a region of nonuniform film thickness in the center portion of eyeglass lens 1.

The sizes of the various portions are identical to those in eyeglass lens 1 of the first implementation mode.

The optical member is not limited to the eyeglass lenses that have been described in the various implementation modes set forth above. Application to various lenses that pass light is possible. For example, application to the lenses present in televisions, projectors, and computer displays is possible.

The optical member and method of manufacturing an optical member of the present invention have been described above. However, the present invention is not limited to the above description.

For example, in the configuration of the optical member of the present invention, replacement with any item that is capable of performing the same function is possible, as is the addition of items of any configuration.

For example, in the present invention, any two or more of the configurations indicated in the first through third implementation modes set forth above can be combined. For example, an intermediate layer 5 can be formed on both the curved concave surface and the curved convex surface.

Further, the method of manufacturing an optical member of the present invention is not limited to the configurations of the above implementation modes, and the order of the steps can be reversed. One or more steps for any purpose can be added and unneeded steps can be eliminated.

EXAMPLES

1. Preparation of the Various Layer-Forming Materials 1-1. Preparation of Primer Layer-Forming Material To a stainless steel vessel were charged 130 weight parts of water, 22 weight parts of ethylene glycol, and 10 weight parts of isopropanol. The mixture was thoroughly stirred, after which 14 weight parts of polyurethane resin ("SF410", average particle diameter 200 nm, made by Dai-ichi Kogyo Seiyaku) were admixed.

One weight part each of acetylene nonionic surfactants ("Surfynol (registered trademark) 104E" and "Surfynol 465", made by Air Products Corp.) and 0.5 weight part of polyether-modified siloxane surfactant ("BYK-348," made by BYK Japan) were added and stirring of the mixture was continued for one hour. Subsequently, the mixture was filtered with a 2 filter to obtain a primer layer-forming material.

1-2. Preparation of Intermediate Layer-Forming Material

The primer layer-forming material prepared in 1-1 above was also used as an intermediate layer-forming material.

1-3. Preparation of Hard Coat Layer-Forming Material

To a stainless steel vessel were charged 46 weight parts of 3-glycidoxypropyltrimethoxysilane ("TSL8350," made by Momentive Performance Materials Japan LLC) and 142 weight parts of 0.05N HCl and the mixture was thoroughly stirred. Subsequently, 86 weight parts of $SiO_2$ sol (solid component 20%, made by SGC Catalysts and Chemicals), 300 ppm of silicone surfactant ("L7604," made by Toray-Dow Corning), 0.2 weight part of Fe catalyst, and 0.8 weight part of Al catalyst were added and thoroughly stirred. Subsequently, MeOH was admixed to achieve a 25% solid component, yielding a hard coat layer-forming material.

2. Manufacturing of Laminate (Eyeglass Lens)

Example 1

[1] First, an eyeglass-use plastic lens substrate with a refractive index of 1.67 ("Seiko Super Sovereign (SSV)" made by Seiko-Epson) was provided as the base material and irradiated for 30 seconds with a low-pressure mercury lamp (UV) to enhance wettability.

[2] Next, cartridges were filled with ink in the form of the primer layer-forming material and intermediate layer-forming material prepared in 1 above. An ink-jet printer ("MMP813H" made by Master Mind) was used to form a 0.5 μm coating of the primer layer-forming material over the entire curved convex surface and entire curved concave surface of the base material and form a 1.5 μm coating of the intermediate layer-forming material in a region 4 mm wide on the edge portion (outer circumference portion) of the base material. This was then dried for one hour at 80° C.

[3] An ultrasonic spray coating method was then used to form a coating of the hard coat layer-forming material prepared in 1 above to a center portion thickness of 18 μm.

With the curved convex surface positioned upward (in the opposite direction from that in which gravity acts), the coating obtained was baked for 5 hours at 125° C. to obtain the laminate (eyeglass lens) of Example 1 having a hard coat layer formed on a lens substrate having a base material and a primer layer.

Comparative Examples 1 to 4

With the exceptions that formation of the intermediate layer was omitted and the thickness of the primer layer formed was as indicated in Table 1, laminates (eyeglass lenses) of Comparative Examples 1 to 4 were obtained in the same manner as in Example 1.

Comparative Examples 5 to 7

With the exceptions that formation of the intermediate layer was omitted, the type of polyurethane resin contained in the primer layer-forming material was varied as indicated in Table 1, and the thickness of the primer layer formed was as indicated in Table 1, the laminates (eyeglass lenses) of Comparative Examples 5 to 7 were obtained in the same manner as in Example 1.

The average particle diameters given in Table 1 are the average particle diameters of the resin in the primer layer-forming material.

The average particle diameters in Table 1 are average particle diameters of resin in the primer layer-forming material.

3. Evaluation 3.1 Evaluation of the Presence of Cracking in the Laminates

The laminates obtained in Example and Comparative Examples were visually observed for the presence of cracking and evaluated on the following scale.
<Evaluation Scale for the Presence of Cracking>
○: No cracks observed in visual observation
x: Cracks observed in visual observation 3.2 Evaluation of Scratch Resistance of Laminate The laminates obtained in Example and Comparative Examples were evaluated for scratch resistance. Bonstar #0000 steel wool (made by Nippon Steel Wool (Ltd.)) was rubbed back and forth 10 times while applying a load of 9.8 N (1 kgf) and the degree of scratching within a range of 1 cm×3 cm was visually evaluated according to the following five levels.
<Evaluation Standard for Scratch Resistance of Laminate>
a: No scratching produced
b: 1 to 5 scratches produced
c: 6 to 20 scratches produced
d: 21 or more scratches produced
e: Scratches produced over entire surface of lens The results are given in Table 1. In Table 1, A/B was calculated using the thickness A of the intermediate film in Examples. In the various Comparative Examples, the thickness A' of the primer layer was employed instead of the thickness A of the intermediate layer in the calculation.

TABLE 1

| | Hard coat layer | Primer layer | | | | Intermediate layer | | | | | |
| | Film thickness in the center portion [μm] | Height B of the top portion | (resin of the center portion) on the thicker portion | | | | (resin of the edge portion) | | | | |
| | | | Type of resin particle | Maker | Average particle diameter [nm] | Film thickness A' [μm] | Type of resin particle | Average particle diameter [nm] | Film thickness A [μm] | A/B × 100 [%] | Cracks | Scratch resistance |
|---|---|---|---|---|---|---|---|---|---|---|---|---|
| Ex. | 18 | 45 | SF410 Polyurethane | Dai-ichi Kogyo Seiyaku | 200 | 0.5 | SF410 | 200 | 1.5 | 3.3 | ○ | a |
| Comp. Ex. 1 | | | | | | 0.5 | — | — | — | 1.1 | x | a |
| Comp. Ex. 2 | | | | | | 1.0 | | | | 2.2 | x | a |
| Comp. Ex. 3 | | | | | | 2.0 | | | | 4.4 | ○ | b |
| Comp. Ex. 4 | | | | | | 4.0 | | | | 8.9 | ○ | c |
| Comp. Ex. 5 | | | SF170 Polyurethane | | 30 | 1.0 | | | | 2.2 | x | a |
| Comp. Ex. 6 | | | | | | 2.0 | | | | 4.4 | x | b |
| Comp. Ex. 7 | | | Polyester resin | | 40 | 2.0 | | | | 4.4 | x | b |

As can be clear from Table 1, in the laminate of Example 1, the relation of A/B being equal to or greater than 3[%] was satisfied. The intermediate layer was a porous film. More specifically, the average particle diameter of the granules contained in the intermediate layer was equal to or greater than 80 DM (see FIG. 5), it was possible to prevent the generation of cracks in the hard coat layer and the laminate had good strength.

By contrast, in the various Comparative Examples, the formation of the intermediate layer was omitted and function of the intermediate layer was borne by the primer layer formed over the entire surface of the base material.

In the various Comparative Examples, the failure to satisfy the relation of A/B being equal to or greater than 3[%] resulted in the generation of cracking in the hard coat layer (see Comparative Examples 1, 2, and 5). Because the primer layer (intermediate layer) was formed all the way through to the center portion, the scratch resistance results were poor (see Comparative Examples 3 and 4). Further, because the intermediate layer was not a porous film, more particularly, since the average particle diameter of the granules contained in the intermediate layer was less than 80 nm (see FIG. 6; due to the small particle diameter, no small particles were photographed), cracks were generated in the hard coat layer and poor scratch resistance results were obtained (see Comparative Examples 6 and 7).

EXPLANATION OF SYMBOLS

1 . . . Eyeglass lens 2 . . . Base material 21 . . . Upper surface 22 . . . Lower surface 3 . . . Primer layer 4 . . . Hard coat layer 5 . . . Intermediate layer 51 . . . Intermittent portion 6 . . . Eyeglass lens A . . . Maximum value of film thickness of intermediate layer B . . . Maximum value of film thickness of thicker portion C . . . Width of intermediate layer

The invention claimed is:

1. An optical member, characterized by comprising:
  a lens substrate having a curved surface,
  a porous intermediate layer formed in an annular shape, and formed continuously or with intermittent gap(s), so as to cover an edge portion of the lens substrate in a planar view along an optical axis of the optical member, and
  a hard coat layer formed so as to cover the lens substrate and the intermediate layer in the planar view; as well as characterized in that
  the hard coat layer comprises a thick film portion, formed on the edge portion of the hard coat layer and thicker than a center portion of the hard coat layer in the planar view, and
  when a maximum film thickness of the intermediate layer is denoted as A ($\mu$m) and a maximum film thickness of the thick film portion is denoted as B ($\mu$m), a relation of A/B being equal to or greater than 3% but equal to or less than 20% is satisfied.

2. The optical member according to claim 1, wherein the intermediate layer is formed continuously so as to cover the entire edge portion of the lens substrate.

3. The optical member according to claim 1, wherein a width of the intermediate layer is equal to or greater than 0.1 mm but equal to or less than 15 mm.

4. The optical member according to claim 1, wherein the maximum thickness of the intermediate layer is equal to or greater than 0.1 $\mu$m but equal to or less than 10.0 $\mu$m.

5. The optical member according to claim 1, wherein a film thickness in the center portion of the hard coat layer is equal to or greater than 1.5 $\mu$m but equal to or less than 50.0 $\mu$m.

6. The optical member according to claim 1, wherein the intermediate layer comprises granules formed of resin material.

7. The optical member according to claim 1, wherein the lens substrate has a curved convex surface and a curved concave surface, and the intermediate layer and the hard coat layer are provided on the curved convex surface.

8. The optical member according to claim 1, wherein the intermediate layer is formed with intermittent gaps so as to cover less than the entire edge portion of the lens substrate.

9. A method of manufacturing an optical member, characterized by comprising:
  forming a porous intermediate layer in an annular shape, continuously or with intermittent gap(s), such that an edge portion of a lens substrate having a curved surface is covered in a planar view along an optical axis of the optical member; and
  forming a hard coat layer having a thick film portion, the thick film portion being formed on the edge portion and thicker than a center portion, such that the lens substrate and the intermediate layer are covered in the planar view; as well as characterized in that
  the hard coat layer is formed so as to satisfy a relation of A/B being equal to or greater than 3% but equal to or less than 20% when a maximum thickness of the intermediate layer is denoted as A ($\mu$m) and a maximum thickness of the thick film portion is denoted as B ($\mu$m).

10. The method of manufacturing and optical member according to claim 9, wherein the intermediate layer is formed continuously so as to cover the entire edge portion of the lens substrate.

11. The method of manufacturing and optical member according to claim 9, wherein the intermediate layer is formed with intermittent gaps so as to cover less than the entire edge portion of the lens substrate.

* * * * *